United States Patent [19]

Kitagawa et al.

[11] Patent Number: 4,562,732
[45] Date of Patent: Jan. 7, 1986

[54] DEVICE FOR DETECTING LIQUID AMOUNT IN A VESSEL

[75] Inventors: Junji Kitagawa; Junji Mizuno; Shigeyuki Akita; Akira Fukami, all of Okazaki, Japan

[73] Assignee: Nippon Soken, Inc., Nishio, Japan

[21] Appl. No.: 488,983

[22] Filed: Apr. 27, 1983

[30] Foreign Application Priority Data

| Apr. 28, 1982 [JP] | Japan | 57-71820 |
| Apr. 30, 1982 [JP] | Japan | 57-71358 |
| Apr. 30, 1982 [JP] | Japan | 57-71359 |
| Feb. 7, 1983 [JP] | Japan | 58-17469 |

[51] Int. Cl.$^4$ .................. G01F 23/00; G01F 23/20
[52] U.S. Cl. .......................... 73/291; 73/296; 374/115; 377/19
[58] Field of Search ............... 73/296, 862.64, 862.65, 73/862.08; 377/19; 177/211, 136; 364/567

[56] References Cited

U.S. PATENT DOCUMENTS

| 1,769,639 | 7/1930 | Gustafson | 73/296 X |
| 1,818,001 | 8/1931 | Moorhouse | 73/296 |
| 3,103,984 | 9/1963 | Ellis et al. | 177/211 |
| 3,661,221 | 5/1972 | Barrett | 177/137 |
| 3,707,076 | 12/1972 | Jones | 73/862.64 X |
| 4,044,920 | 8/1970 | Swartzendruber | 73/862.65 X |
| 4,076,088 | 2/1978 | Gallo et al. | 177/177 X |
| 4,121,457 | 10/1978 | Yoshida et al. | 73/291 |
| 4,122,720 | 10/1978 | Podl | 374/115 X |
| 4,139,069 | 2/1979 | Domis et al. | 364/567 X |
| 4,236,144 | 11/1980 | Sunagawa | 374/142 X |
| 4,294,320 | 10/1981 | Bilstad et al. | 364/567 X |
| 4,294,322 | 10/1981 | Nishiyama | 364/567 |
| 4,350,048 | 9/1982 | Kovacs | 73/862.65 X |
| 4,384,793 | 5/1983 | O'Brien | 374/115 X |
| 4,386,406 | 5/1983 | Igarashi et al. | 73/313 X |
| 4,407,160 | 10/1983 | van de Velde | 73/296 |
| 4,463,604 | 8/1984 | Kitagawa et al. | 73/296 |

Primary Examiner—Daniel M. Yasich
Attorney, Agent, or Firm—Cushman, Darby & Cushman

[57] ABSTRACT

A device for detecting the amount of liquid in a vessel, such as a fuel tank of an automobile, using a torsion support member such as a torsion bar arranged between the vessel and the body of the automobile. The torsion displacement of the member corresponding to the amount of the liquid is detected in a detection circuit and processed in an electronic unit which includes a portion for generating a pulse width signal corresponding to the amount of the liquid on the basis of signals from the detection circuit, a portion for generating a signal having a pulse number proportional to the pulse width on the basis of the generated pulse width signal, and a portion for averaging at predetermined intervals the value corresponding to the pulse number of the signal from the pulse width detection portion using timing pulses generated at predetermined intervals and for displaying the average amount of the liquid digitally on a display portion.

11 Claims, 31 Drawing Figures

Fig. 10A
Fig. 10B
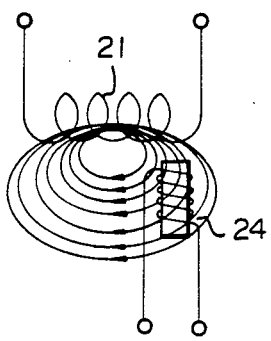
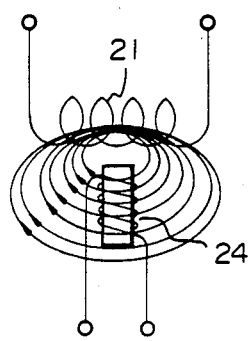
Fig. 11
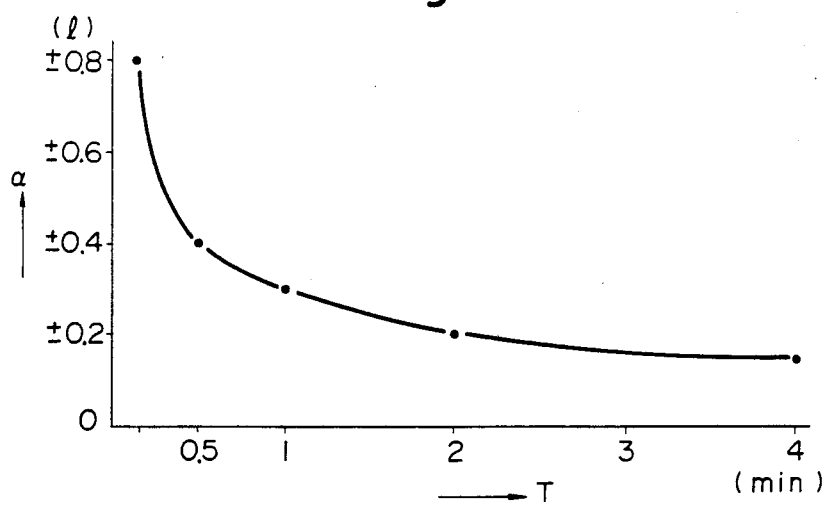

DEVICE FOR DETECTING LIQUID AMOUNT IN A VESSEL

BACKGROUND OF THE INVENTION

1. Field of the Invention

The present invention relates to a device for detecting the amount of liquid in a vessel. The device according to the present invention is used, for example, for detecting the amount of fuel in a fuel tank provided in an automobile.

2. Description of the Prior Art

In a known device for detecting the amount of liquid in a vessel, a float is provided to float on the surface of the liquid, a contact is fixed to the float, and a resistor is provided to work with the contact. The contact slides on the resistor in accordance with the movement of the float due to the change in the level of the liquid. Hence, the amount of the liquid is detected by the change of resistance between the contact and one end of the resistor.

It is difficult to correctly detect an amount of liquid by such a device, however, because of differences between the shape of the vessel and the shape of the surface of the resistor, differences in resistance due to the contact area between the contact and the resistor, and volumetric expansion of the liquid due to temperature changes.

In this regard, there has long been a demand for a device which can correctly detect the amount of fuel in the fuel tank of an automobile, where there is the additional problem of vibration. No satisfactory device has yet been developed.

SUMMARY OF THE INVENTION

It is the object of the present invention to provide an improved device for detecting with high precision the amount of liquid in a vessel without being influenced by the shape or vibration of the vessel.

According to a fundamental aspect of the present invention, there is provided a device for detecting an amount of liquid in a vessel comprising: means for effecting torsion support against the weight of the vessel and the liquid in the vessel, means for electrically detecting a torsion displacement of the torsion support means, and an electronic unit for receiving signals from the detecting means. The electronic unit comprises means for generating a pulse width signal corresponding to the amount of liquid on the basis of signals from the detection means, means for detecting the pulse width, i.e., generating a signal having a pulse number proportional to the pulse width on the basis of the generated pulse width signals, a circuit for generating timing pulses at predetermined intervals, and means for averaging at predetermined intervals the value corresponding to the pulse number of the signal from the pulse width detection means, using the generated timing pulse, and for displaying the average amount of the liquid.

BRIEF DESCRIPTION OF THE DRAWINGS

In the drawings

FIGS. 10A and 10B illustrate the generation of torsion response voltage in first and second coils in the device of FIG. 1;

FIG. 11 is a graph of the error characteristic of the device of FIG. 1;

DESCRIPTION OF THE PREFERRED EMBODIMENTS

Figure 1:
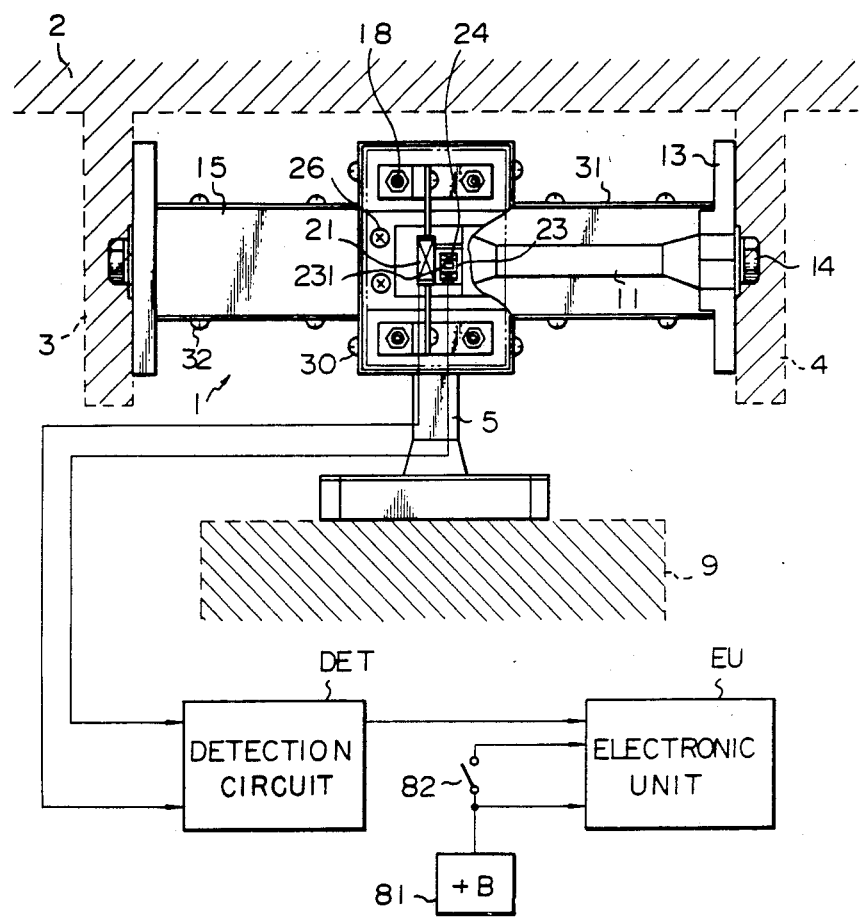
FIG. 1 illustrates a device for detecting the amount of liquid in a vessel according to an embodiment of the present invention.
Figure 2:
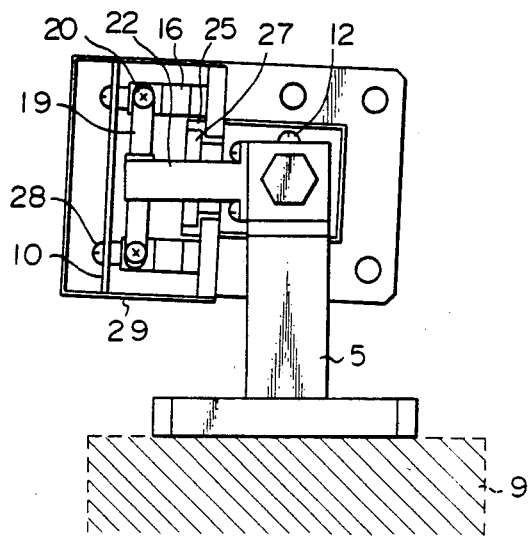
FIG. 2 is a cross-sectional view of a torsion support unit in the device of FIG. 1.

A device for detecting the amount of liquid in a vessel according to an embodiment of the present invention is illustrated in FIG. 1. A cross-section of a torsion support unit in the device of FIG. 1 is illustrated in FIG. 2. In the device of FIG. 1, a torsion structure 1 receives a torsion force as a torsion support unit due to the weight of a vessel 2 containing liquid. The torsion structure 1 is fixed to projections 3 and 4 of the vessel 2. An arm 5 of the torsion structure 1 is fixed to a support base 9.

Figure 3:
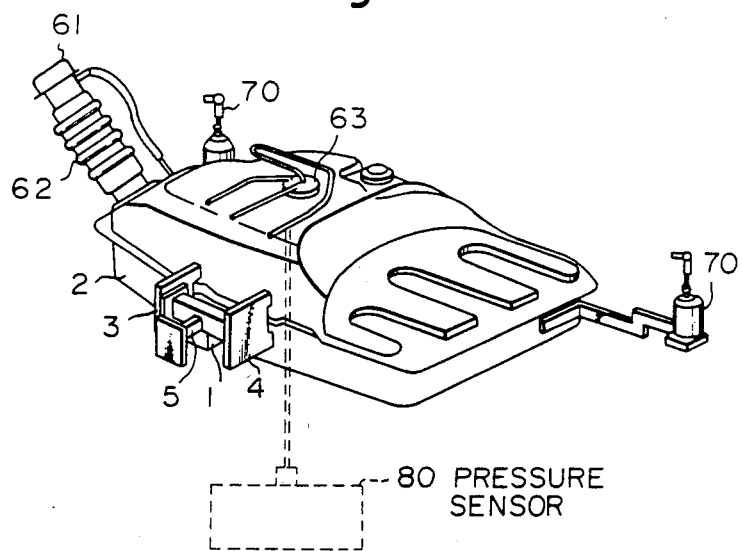
FIG. 3 is a perspective view of the torsion support unit attached to the vessel.

The manner in which the torsion structure 1 is fixed to the vessel 2 is illustrated in the perpective view of the unit in FIG. 3. In FIG. 3, an oil feeding port 61 and a flexible tube 62 are provided in the vessel 2. The flexible tube 62 is provided to allow for the displacement of the vessel, since the oil feeding port 61 is fixed to the body of an automobile, while the vessel 2 is subject to displacement due to the torsion displacement of the torsion structure 1 caused by the weight of the vessel 2 and the contained liquid. The flexible tube 62 is provided for allowing the displacement of the vessel 2.

The ends of damper members 70, 70 are coupled to the body of the automobile. An oil feeding pipe 63 for the engine of the automobile, a detection circuit DET, an electronic unit EU, a storage battery 81, and a key switch 82 are provided in the device of FIG. 1.

One end of the arm 5 is press-fitted into a torsion bar 11 and further secured by a screw bolt 12. Instead of the screw bolt, a pin may also be used. One end of the torsion bar 11 is press-fitted into a flange 13. The end of the torsion bar press-fitted into the flange 13 has a hexagonal cross-section, the torsion bar 11 is further secured to the flange 13 by a screw bolt 14. Instead of the screw bolt, a pin may also be used.

A plate 15 is fixed to the flange 13. The plate 15 and the flange 13 constitute a body. Each of stems 16 is fixed to the plate 15 by means of a screw bolt 18 which acts as support column. A first bobbin 19 is supported by the stems 16 through screw bolts 20.

A first coil 21 is wound on the first bobbin 19. A stem 22 is fixed to the torsion bar 11. A second coil 24 is wound on a bobbin 23 containing a ferrite magnetic core 231. The bobbin 23 is attached to and supported by the stem 22.

A seal 27 made of urethane foam rubber is attached inside of a cover 25 fixed to the plate 15 by means of screw bolts 26. The seal 27, through which the stem 22 penetrates, prevents water and dust from entering the electric circuit portion.

An electric circuit board 10 which accommodates the detection circuit DET is fixed to the screw bolts 18 by means of screw bolts 28. Electric wires (not shown) connected to the electric circuit board 10 penetrate a cover 29 which protects the electric circuit board 10. The protective cover 29 is fixed to the plate 15 by means of screw bolts 30. Another protective cover 31 is fixed to the plate 15 by means of screw bolts 32.

The structures of the detection circuit DET and the electronic unit EU are illustrated in FIGS. 5A, 5B, 6A and 6B respectively.

Figure 5A:
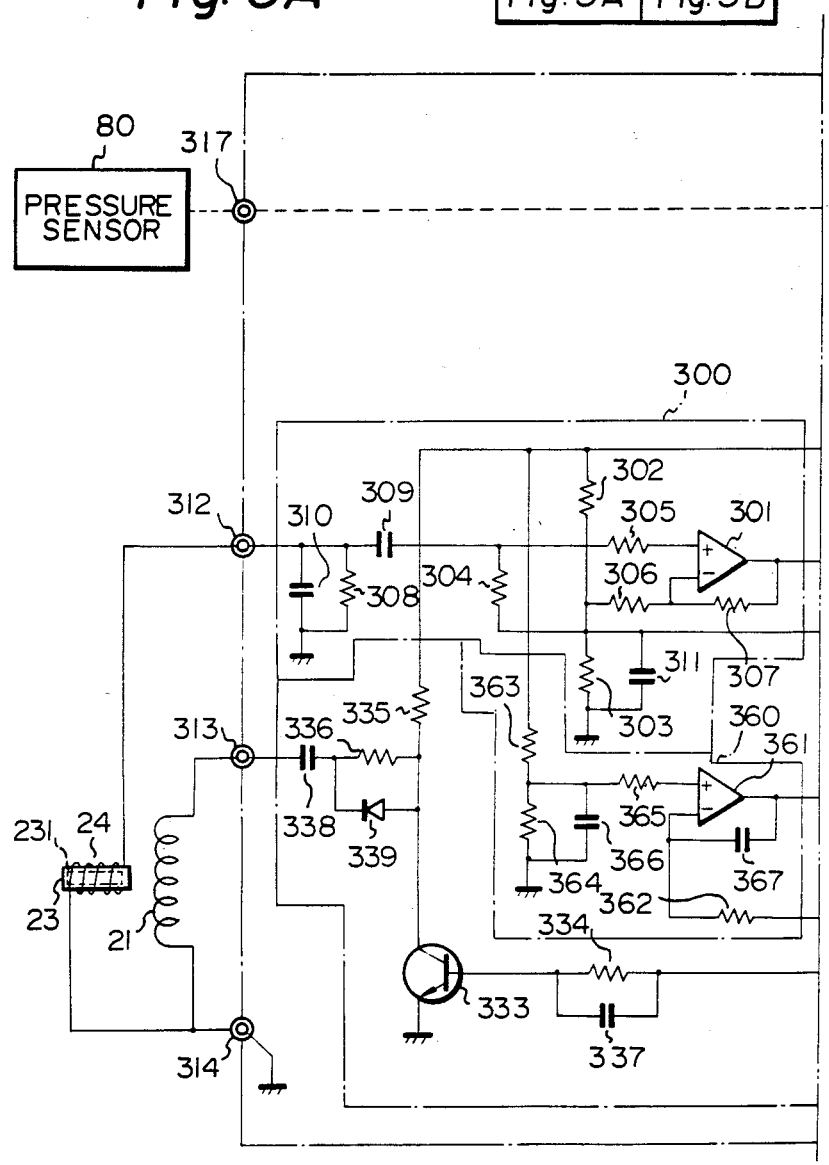
FIGS. 5A and 5B are portions of a circuit diagram of a detecting unit in the device of FIG. 1.
Figure 5B:
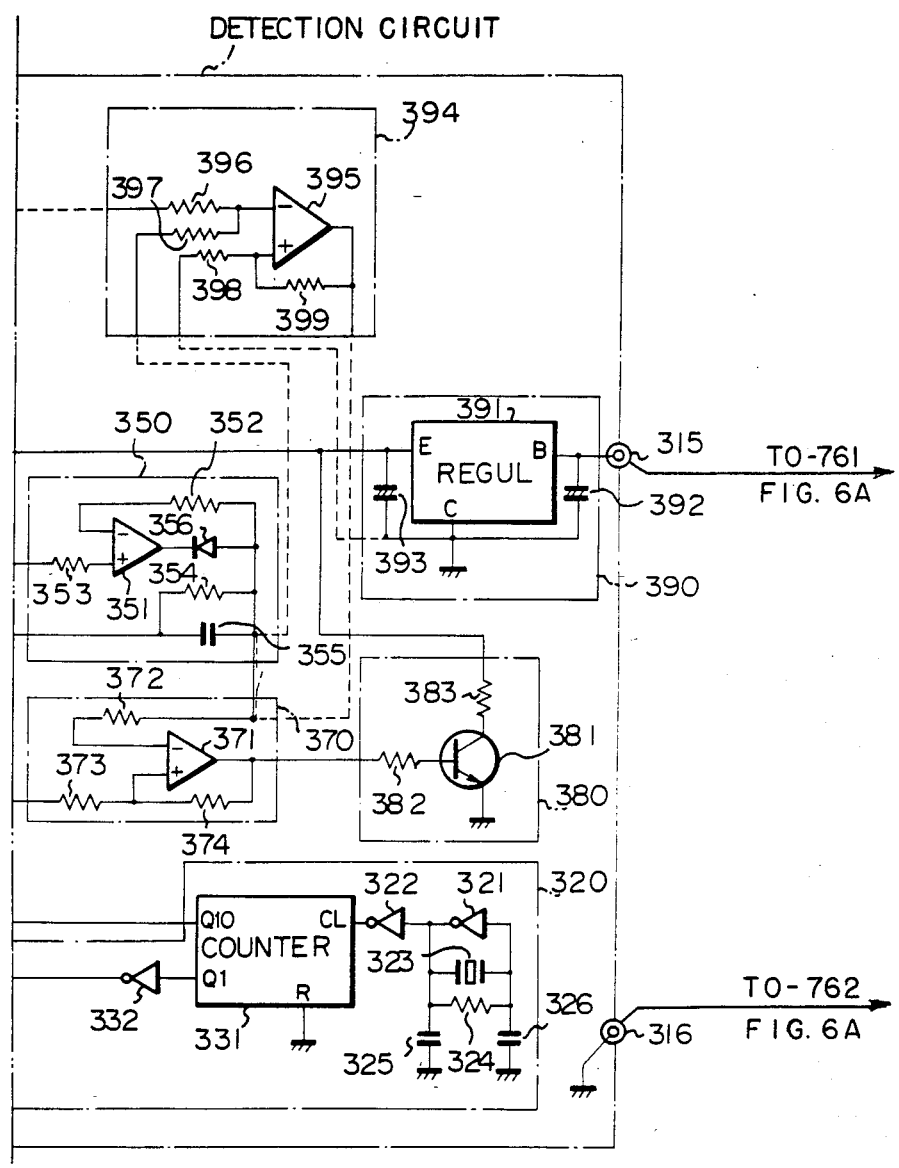

In FIGS. 5A and 5B, a terminal 312 is connected to one terminal of the second coil 24 wound on the second bobbin 23. The other terminal of the second coil 24 is connected to a terminal 314. A terminal 313 is connected to one terminal of the first coil 21 wound on the first bobbin 19 (not shown). The other terminal of the first coil 21 is connected to the terminal 314.

A constant voltage circuit 390 includes a regulator 391, such as NO7806 manufactured by Motorola, and capacitors 392 and 393. The constant voltage circuit 390 generates a predetermined constant voltage.

An oscillator circuit 320 includes a oscillation portion having inverter gates 321 and 322, a ceramic oscillation element 323, a resistor 324, and capacitors 325 and 326; a binary counter 331 such as TC4020 manufactured by Tokyo Shibaura Electric Co.; an inverter gate 332; a transistor 333; resistors 334, 335, and 336; capacitors 337 and 338; and a diode 339. The oscillator circuit 320 supplies a rectangular wave signal through the terminal 313 to the first coil 21.

An amplifier circuit 300 includes an operational amplifier 301, resistors 302 through 308, and capacitors 309, 310, and 311. The amplifier circuit 300 amplifies the signal generated from the second coil 24.

A peak hold circuit 350 includes an operational amplifier 351, resistors 352, 353, and 354, a capacitor 355, and a diode 356. The peak hold circuit 350 holds the negative peak voltage of the signal from the amplifier circuit 300.

A triangle wave signal generation circuit 360 includes an operational amplifier 361, resistors 362 through 365, and capacitors 366 and 367.

A pulse width conversion circuit 370 includes an operational amplifier 371 and resistors 372, 373, and 374, and generates a signal with a pulse width proportional to the voltage of the signal from the peak hold circuit 350.

A current value conversion circuit 380 includes a transistor 381 and resistors 382 and 383 and converts the signal from the pulse width conversion circuit 370 into the change of the value of current. The output terminal of the current value conversion circuit 380 is connected through the constant voltage circuit 390 to a power source terminal 315. Thus, the change of the value of current representing the displacement of the second coil 24 with respect to the first coil 21 is transmitted to the power source terminal 315.

Figure 6A:
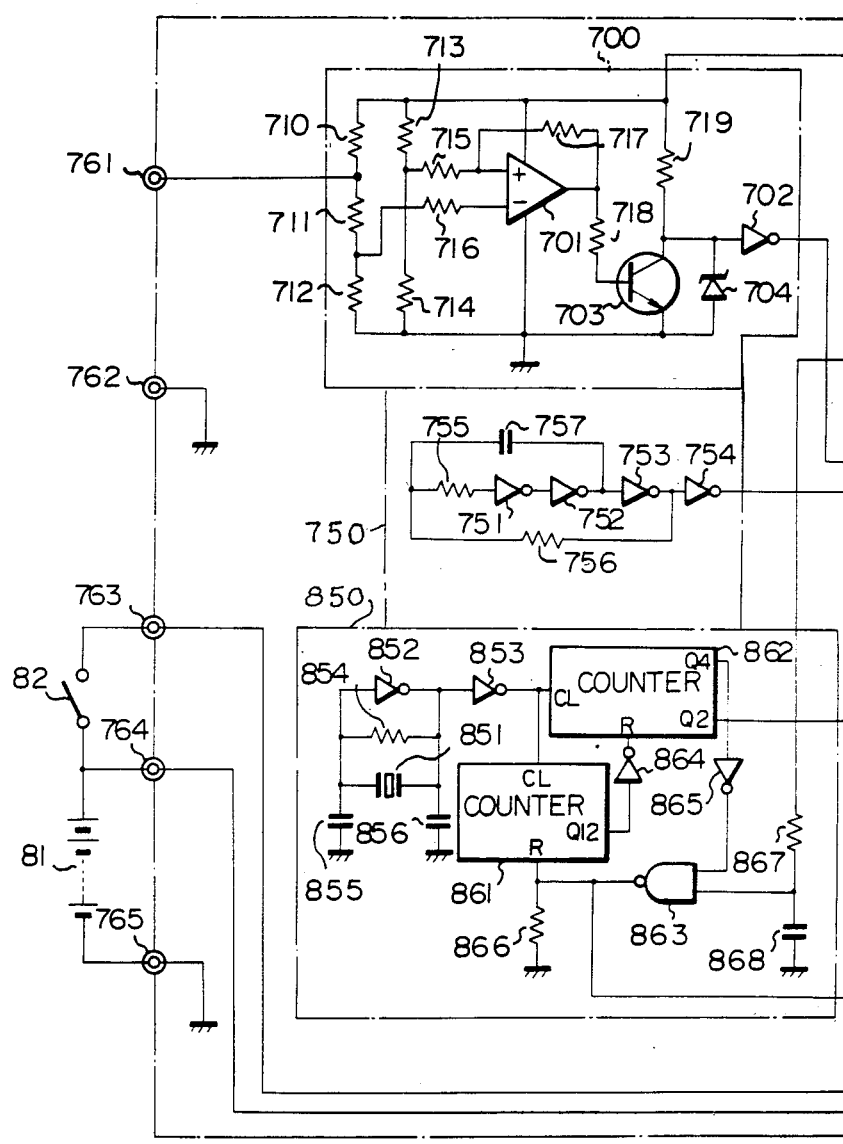
FIG. 6A and 6B are portions of a circuit diagram of an electronic unit in the device of FIG. 1.
Figure 6B:
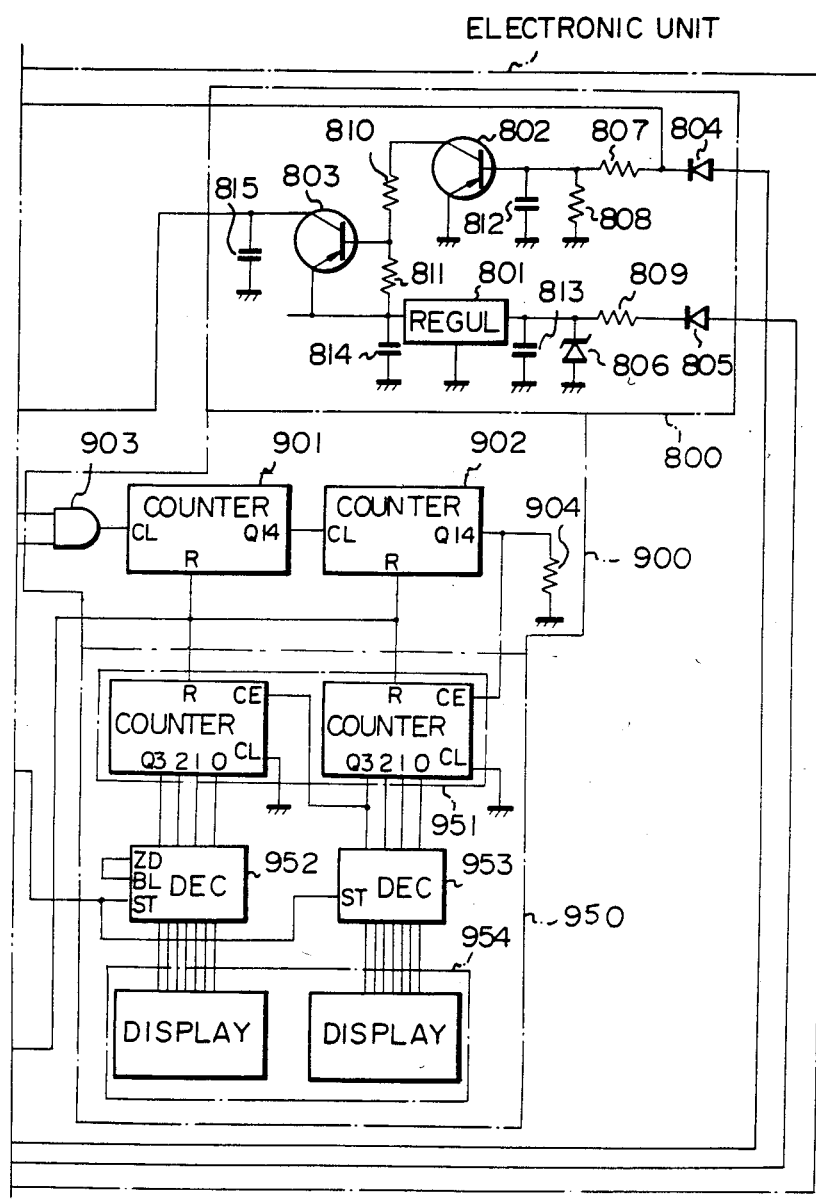

In FIG. 6A and 6B, power from a storage battery 81 is supplied directly or through a key switch 82 to the electronic unit EU. Power source terminals 764 and 763 are connected directly or through the key switch 82 to one terminal of the storage battery 81. A ground terminal 765 is connected to the ground terminal of the storage battery 81. Input terminals 761 and 762 are connected to the output terminal 315 and 316 of the detection circuit illustrated in FIG. 5A and 5B.

A pulse width signal generation circuit 700 includes a comparator 701, an inverter gate 702, a transistor 703, a zener diode 704, and resistors 710 through 719 and reproduces the pulse width signal generated by the pulse width conversion circuit 370 in the detection circuit on the basis of the potential of the terminal 761 determined by the current passing through the resistor 710.

An RC oscillator circuit 750 includes inverter gates 751 through 754, resistors 755 and 756, and a capacitor 758 and generates a pulse signal.

A power source circuit 800 includes a regulator 801 such as MC7805 manufactured by Motorola, transistors 802 and 803, diodes 804 and 805, a zener diode 806, resistors 807 through 811, and capacitors 812 through 815. The output voltage of the regulator 801 is constant. The collector of the transistor 803 delivers a predetermined constant voltage only when the key switch 82 is ON.

A timing pulse generation circuit 850 includes a oscillator circuit including a ceramic oscillation element 851, inverter gates 852 and 853, a resistor 854, and capacitors 855 and 856; a binary counter 861 such as TC4020 manufactured by Tokyo Shibaura Electric Co.; a decimal counter 862 such as TC4017 manufactured by the same company; a NAND gate 863; inverter gates 864 and 865; resistors 866 and 867; and a capacitor 868. The timing pulse generation circuit 850 delivers a memory signal and a resetting signal at predetermined intervals.

A pulse width detection circuit 900 includes binary counters 901 and 902 such as TC 4020 of Tokyo Shibaura Electric Co., an AND gate 903, and a resistor 904 and generates a signal having a pulse number proportional to the pulse width of the pulse width signal by adding the signal from the RC oscillator circuit 750 to the signal from the pulse width signal generation circuit 700.

An average value calculation and display cirucit 950 includes a counting-up counter 951 such as TC 4518 manufactured by Tokyo Shibaura Electric Co., decoders 952 and 953 such as TC 5068 manufactured by the same company, and a display member 954. The average value calculation and display circuit 950 counts the frequency of the output signal of the pulse width detection circuit 900 at predetermined intervals and displays digitally with high precision the amount of the liquid measured.

The operation of the detection circuit DET of FIGS. 5A and 5B and the electronic unit EU of FIGS. 6A and 6B will now be described. The pulse signal delivered from the inverter gate 322 of the oscillator circuit 320 is supplied to the CL terminal of the binary counter 331 of FIG. 5B. The pulse signal illustrated in FIG. 12(1) is delivered from the Q1 terminal of the binary counter 331. The pulse signal from the Q1 terminal is supplied to the inverter gate 332, the output signal of which is supplied through the RC circuit composed of resistor 334 and capacitor 337 to the transistor 333. The signal from the collector of the transistor 333 is supplied through the resistor 336, capacitor 338, and terminal 313 to the first coil 21.

Figure 12:
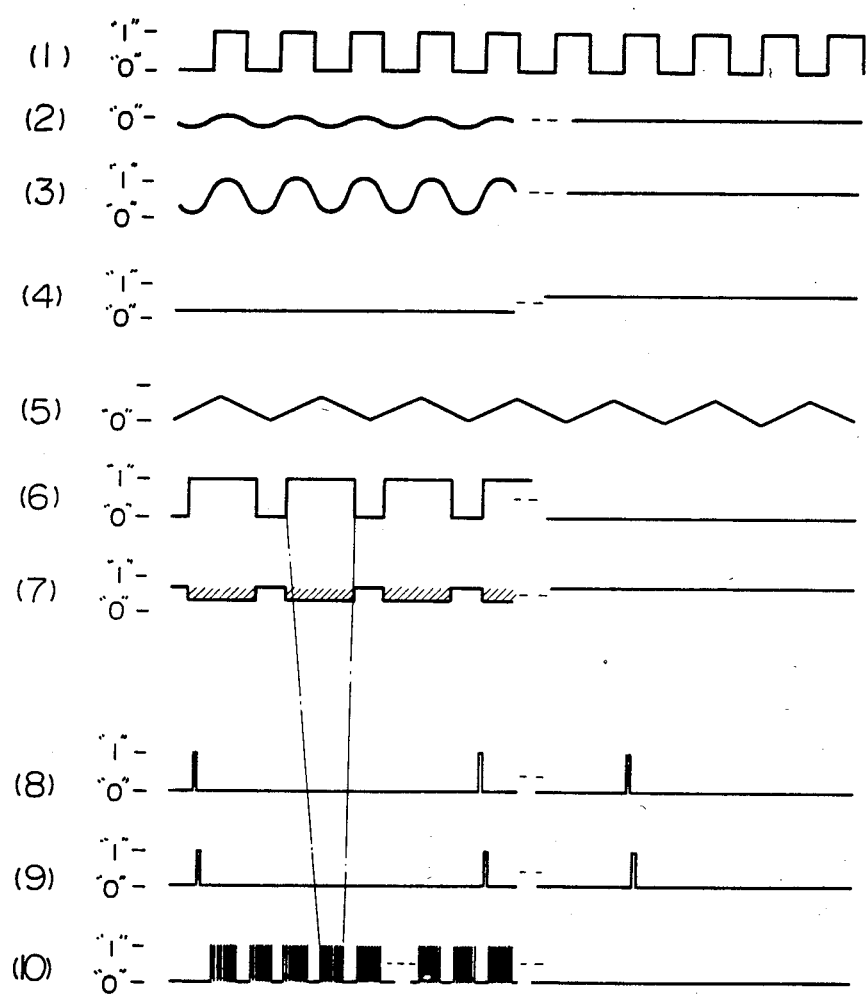
FIG. 12 is illustrates waveforms of signals in the circuits of FIGS. 5 and 6.

When liquid to be measured is introduced into the vessel 2, torsion displacement of the vessel 2 connected to the torsion bar 11 occurs, with respect to the arm 5 fixed to the support base 9, to the extent of some angle of torsion displacement. When such torsion displacement occurs, the second coil 24 moves to the position illustrated in FIG. 10A with respect to the position of the coil 21 from the position illustrated in FIG. 10B. Hence, the portion of the fluxes, generated by the coil 21, intersecting the second coil 24 is increased. Accordingly, the voltage signal, illustrated in FIG. 12(2), corresponding to the angle of the torsion displacement is generated from the second coil 24. The generated voltage signal is supplied to the capacitor 309 in the amplifier circuit 300 in the detection circuit DET. A reference voltage obtained from the voltage division resistors 302 and 303 is supplied through the resistor 304 to one terminal of the capacitor 309 and through the resistor 304 and the resistor 305 to the non-inverting terminal of the operational amplifier 301. The reference voltage is also supplied through the resistor 306 to the inverting terminal of the operational amplifier 301. Thus, the signal, illustrated in FIG. 12(2), supplied to the capacitor 309 is amplified by the operational amplifier 301 as illustrated in FIG. 12(3).

The amplified signal is supplied through the resistor 353 to the non-inverting input terminal of the operational amplifier 351 in the peak hold circuit 350. Since the negative peak voltage of the amplified signal is lower than the reference voltage obtained from the voltage division resistors 302 and 303, a negative peak voltage held signal illustrated in FIG. 12(4) is delivered from the peak hold circuit 350.

A pulse signal delivered from the Q10 terminal of the binary counter 331 in the oscillator circuit 320 is supplied through the resistor 362 of the triangle wave signal generation circuit 360 to the inverting input terminal of the operational amplifier 361. A triangle wave signal illustrated in FIG. 12(5), based on the time constant of the resistor 362 and the capacitor 367, is delivered from the output terminal of the operational amplifier 361.

The triangle wave signal from the operational amplifier 361 is supplied through the resistor 373 to the non-inverting input terminal of the operational amplifier 371 in the pulse width conversion circuit 370. The signal illustrated in FIG. 12(4) is supplied to the inverting input terminal of the operational amplifier 371. Thus, a signal illustrated in FIG. 12(6) is delivered from the output terminal of the operational amplifier 371.

The delivered signal illustrated in FIG. 12(6) is supplied to the current value conversion circuit 380. Hence, the ON and OFF operation of the transistor 381 occurs. Thus, the required current passes through the resistor 710 in the pulse width signal generation circuit 700 via the constant voltage circuit 390. Accordingly, the signal illustrated in FIG. 12(7) having a pulse width corresponding to the torsion angle of the torsion bar 11 is delivered from the output terminal 315. The waveform of the signal illustrated in FIG. 12(7) consists of the combination of portions of a predetermined high level and portions of the level lower than the predetermined high level.

The voltage of the signal illustrated in FIG. 12(7) is divided by voltage division resistors 711 and 712. The voltage divided signal is supplied through the resistor 716 to one input terminal of the comparator 701, while the voltage obtained from the voltage division resistors 713 and 714 is supplied through the resistor 715 to the other input terminal of the comparator 701. As a result of the comparison in the comparator 701, an output signal the same as the signal illustrated in FIG. 12(6) is delivered from the comparator 701.

The pulse signals delivered from the inverter gate 853 is supplied to each of the CL terminals of the binary counter 861 and the decimal counter 862 in the timing pulse generation circuit 850. When the potential of the Q12 terminal of the binary counter 861 becomes "1", the potential of the R terminal of the decimal counter 862 becomes potential "0" and counting is started. A memory signal illustrated in FIG. 12(8) is delivered from the Q2 terminal of the decimal counter 862. Also, a resetting signal illustrated in FIG. 12(9) is delivered from the Q4 terminal of the decimal counter 862. Hence, the potential of the R terminal of the binary counter 861 becomes "1" so that the binary counter 861 is reset. Thus, a memory signal illustrated in FIG. 12(8) and a resetting signal illustrated in FIG. 12(9) are delivered from the timing pulse generation circuit 850 at a predetermined interval.

The signal from the pulse width signal generation circuit 700 and the signal from the RC oscillation circuit 750 are supplied to the AND gate 903 in the pulse width detection circuit 900. The AND gate 903 delivers the signal illustrated in FIG. 12(10), which represents the pulse width signal illustrated in FIG. 12(6) to which the pulse signal from the RC oscillation circuit 750 is added. The signal from the AND gate 903 is frequency-divided by binary counters 901 and 902 so that a signal having a pulse number proportional to the average of the pulse width signals illustrated in FIG. 12(6) during a predetermined period is delivered from the pulse width detection circuit 900 every resetting signal illustrated in FIG. 12(9).

The signal from the pulse width detection circuit 900 is counted by the counting-up counter 951. The first digit of the count of the counter 951 is supplied to the decoder 953, while the 10th digit of the count of the counter 951 is supplied to the decoder 952. The counts supplied to the decoders 952 and 953 are stored every time the memory signal illustrated in FIG. 12(8) is supplied to the ST terminals of the decoders 952 and 953 at predetermined intervals. The count stored in the decoders 952 and 953 is supplied to the display member 954. Thus, a pulse number proportional to the average of the pulse width signals illustrated in FIG. 12(6), representing the amount of the liquid measured, is displayed with high precision on the display member 954.

Figure 7:
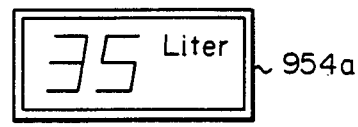
FIG. 7 illustrates an example of the display by an average value calculation and display circuit.

An example of the display on the display member 954 is illustrated in FIG. 7 as 954a.

Contrary to the above-described case, when no liquid is contained in the vessel 2, no torsion displacement of the vessel 2 occurs with respect to the arm 5 fixed to the support base 9. Hence, the position of the second coil 24 is the center position of the first coil 21, as illustrated in FIG. 10B.

Hence, no portion of the flux generated by the first coil 21 intersects vertically the second coil 24. Accordingly, the potential of the signal from the second coil 24 is "0" as illustrated in right half portion of FIG. 12(2).

Hence, the voltage of the output signal of the amplifier circuit 300 becomes equal to the reference voltage obtained from the voltage division resistors 302 and 303, as illustrated in FIG. 12(3). Accordingly, the voltage of the output signal of the peak hold circuit 350 become equal to the voltage of FIG. 12(3), as illustrated in FIG. 12(4), so that the potential of the output terminal of the pulse width conversion circuit 370 becomes "0", as illustrated in FIG. 12(6).

Since the output signal of the pulse width conversion circuit 370 is supplied to the current value conversion circuit 380, a signal of a predetermined voltage, illustrated in FIG. 12(7), is obtained at the terminal 315 to deliver the indication that no torsional displacement of the torsion bar 11 from the preselected original state occurs.

Since a signal having the potential "0", the same as the potential of the pulse width signal illustrated in FIG. 12(6), is delivered from the output terminal of the pulse width signal generation circuit 700, the potential of the output signal of the AND gate 903 in the pulse width detection circuit 900 becomes "0", as illustrated in FIG. 12(10).

Hence, no pulse signal is supplied to the counting-up counter 951 in the average value calculation and display circuit 950. Accordingly, no data is stored in the decoders 952 and 953 to show the fact that no pulse signal is received. Thus, a digital indication "0" of the amount of the liquid to be measured is displayed on the display member 954.

While the automobile is running, the angle of torsional displacement varies due to the vibration of the vessel 2 or the vibration of the liquid to be measured in the vessel 2. Hence, the pulse width of the signal from the detection circuit illustrated in FIG. 12(7) varies and error may occur in the detection of the amount of the liquid.

By obtaining the average value for a predetermined period T controlled by the timing pulse generation circuit 850, it is possible to detect and display the amount of the liquid with relatively high precision.

The relationship between the above-mentioned predetermined period T and the error $\alpha$ in the detection of the amount of the liquid, obtained from the results of experiments carried out by the inventors, is illustrated in FIG. 11. The abscissa represents the predetermined period T [min], and the ordinate represents the error $\alpha$ [l]. It can be observed that the error is reduced as the length of the period is increased. For example, the error is only $\pm 0.3$ l when the period T is 1 minute. In an automobile running at the speed of 100 km/hr and with a fuel consumption rate of 6 km/l, it takes only approximately 3.6 minutes to consume 1 l of the fuel. Hence, in such an automobile, it is impossible to carry out the display on the display member 954 with a unit of 1 l.

Under these circumstances, it is preferable to select the value 1 through 3 minutes for the predetermined period T defined by the timing pulse generation circuit 850.

Figure 4:
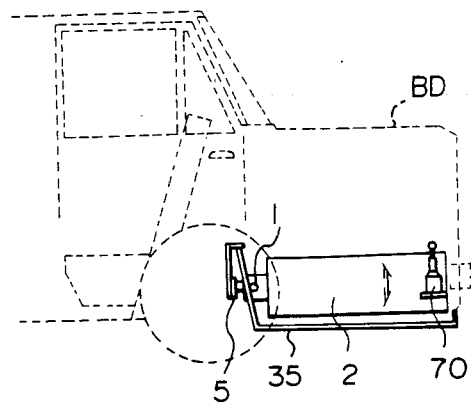
FIG. 4 illustrates the vessel arranged in a rear bottom portion of an automobile.

An example of the arrangement of the vessel 2 in the rear bottom portion of the body BD of the automobile is illustrated in FIG. 4. A safety belt 35 for preventing the vessel 2 from dropping and the damper member 70 are included in the illustration of FIG. 4. The damper member 70 is provided to prevent excessive vibration of the vessel 2 and the body BD of the automobile from breaking the torsion bar 11, deteriorating the precision of the liquid amount detection, and generating noise.

Figure 8:
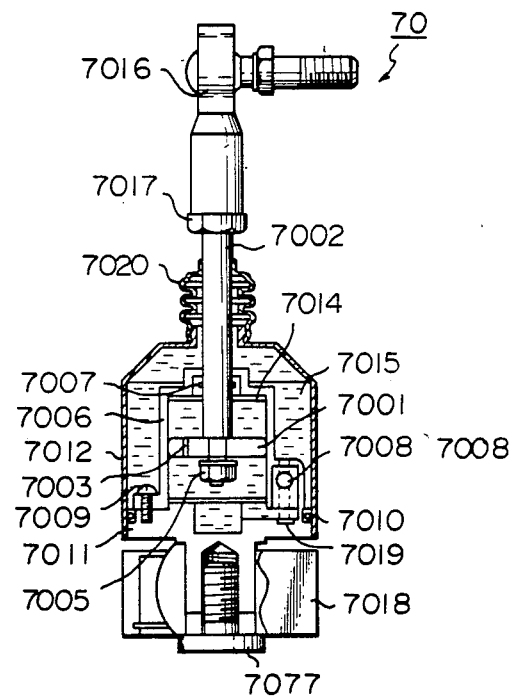
FIGS. 8 and 9 illustrate a damper unit used for the vessel in FIG. 3.
Figure 9:
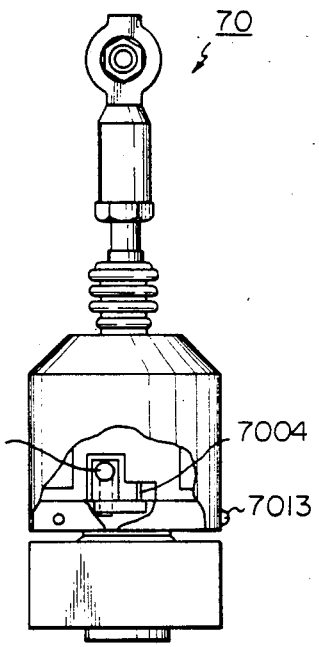

An example of the structure of the damper member 70 is illustrated in FIGS. 8 and 9. A piston 7001 is fixed to a shaft 7002 by means of a screw nut 7005. A through-hole 7003 is provided in the piston 7001. A cylinder 7006 is fixed to a base 7011 by means of screw bolts 7009. A bushing 7007 is provided inside of the cylinder 7006. A seal (not shown) is provided between the cylinder 7006 and the base 7011. A check valve 7008 a spring 7019, and a through-hole 7004 are provided in the cylinder 7006. A cover 7012 is fixed through an O-ring 7010 to the base 7011 by means of screw bolts 7013. A rubber sheet 7014 is provided. A bellows structure 7020 is provided at the top of the cover 7012.

Oil 7015 is filled inside of the cylinder 7006 and inside of the cover 7012 for an oil-damping operation. The shaft 7002 is coupled to a support member 7016 of the body side. A screw nut 7017 is provided for fixing the shaft 7002. A support member 7018 of the vessel side is fixed to the base 7011 by means of a screw bolt 7077.

The support member 7016 of the body side and the support member 7018 of the vessel side are movable in the radial direction by means of a ball bearing structure (not shown). The body side support member 7016 is fixed to the body BD of the automobile, while the vessel side support member 7018 is fixed to the vessel 2.

It is preferable to give the body side support member 7016 and the vessel side support member 7018 freedom of the movement in the radial direction so as to ensure satisfactory operation of the damper member 70, in view of the fact that the vessel is movable in the circumferential direction of a circle having a center at the position of the torsion bar 11 of the torsion structure 1.

Also, it is preferable to select the stroke of the damper member 70 corresponding to the change of the displacement of the vessel in accordance with the amount of the liquid in the vessel.

Although a preferred embodiment of the present invention has been described heretofore with reference to FIGS. 1 through 12, it will be understood that various modifications and alterations are possible within the scope of the present invention. A number of modified embodiments will be described below.

For example, a pressure sensor 80 may be connected to the oil feeding pipe 63 for detecting the pressure in the vessel 2, as illustrated in broken lines in FIG. 3.

Figure 13:
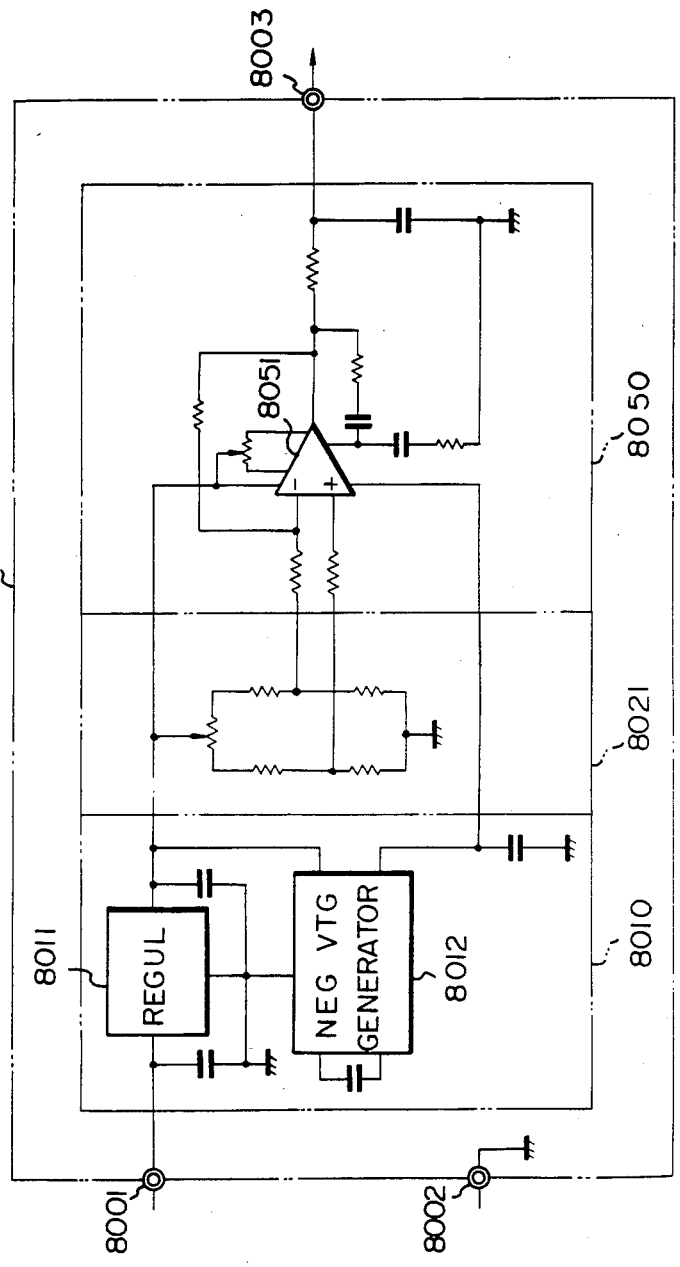
FIG. 13 is a circuit diagram of a pressure sensor unit used for vessel in FIG. 3.

An example of the circuit diagram of the pressure sensor 80 is illustrated in FIG. 13. A terminal 8001 is connected to one terminal of the storage battery 81, while the ground terminal 8002 is connected to the ground terminal of the storage battery 81. A constant voltage circuit 8010 includes a regulator 8011 such as, MC 7805 manufactured by Motorola, a negative voltage generator 8012 such as ICL 7660 manufactured by Intercil, and capacitors and delivers signals by predetermined positive and negative voltages.

A known minute pressure sensor circuit 8021 of a semiconductor pressure sensor with a diaphragm is provided in the pressure sensor 80. One side of the diaphragm of the minute pressure sensor circuit 8021 receives the pressure in the vessel 2, while the other side of the diaphragm receives the atmospheric pressure. The displacement of the diaphragm is detected electrically using a bridge circuit including a pressure-to-resistance element. Between the output terminals of the minute pressure sensor circuit 8021, an output voltage proportional to the pressure in the vessel 2 is obtained.

The obtained output voltage is supplied to a differential amplifier circuit 8050 which includes an operational amplifier 8051, such as A725 manufactured by Fairchild, and a network of resistors and capacitors. The differential amplifier 8050 amplifies the minute output voltage of the minute pressure sensor circuit 8021 and delivers a positive voltage proportional to the pressure in the vessel when the pressure in the vessel is negative and a negative voltage proportional to the pressure in the vessel when the pressure in the vessel is positive. The output terminal 8003 of the pressure sensor 80 is connected to the terminal 317 of the detection circuit illustrated in FIGS. 5A and 5B.

When the pressure sensor 80 is used in association with the detection circuit of FIGS. 5A and 5B, a voltage difference detection circuit 394 is connected, as illustrated in broken lines in FIGS. 5A and 5B, and the direct coupling between the output line of the peak hold circuit 350 and the resistor 372 connected to the converting input terminal of the operational amplifier 371 is disconnected, as represented in the broken line having the open-circuit indication. A voltage division circuit composed of resistors 396 and 397 is connected to the inverting input terminal of an operational amplifier 395.

One terminal of the resistor 396 receives the signal of the pressure sensor 80. One terminal of the resistor 397 receives the signal of the peak hold circuit 350.

It is preferable to select the value $R_1$ (resistor 396), $R_2$ (resistor 397), $R_S$ (resistor 398), and $R_f$ (resistor 399) with the following relationship:

$$(R_1+R_2)/R_1 = 1 + R_f/R_S.$$

Under such a relationship, the voltage difference detection circuit 394 delivers a signal having a voltage equal to the difference between the output voltage of the peak hold circuit 350 and the output voltage of the pressure sensor 80.

This signal delivered from the voltage difference detection circuit 394 represents the torsion angle due to the true weight of the liquid to be measured excluding the torsion angle due to the vapor pressure of the liquid.

Although the pressure sensor 80 is connected through a pipe to the vessel 2, as illustrated in FIG. 3, it is, of course, possible to detect directly the pressure in the vessel 2.

Figure 14:
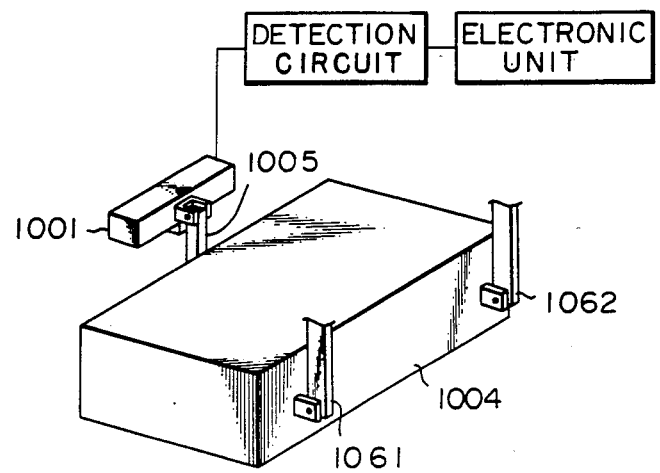
FIG. 14 is a perspective view of a device for detecting the amount of liquid in a vessel according to a modified embodiment of the present invention.

Another modified embodiment of the present invention is illustrated in FIG. 14. Details of FIG. 14 are illustrated in FIGS. 16 and 18 through 20. The structure illustrated in FIG. 14 includes a liquid amount detection unit 1001, a connecting rod 1005, support mumbers 1061 and 1062, and a vessel 1004. The vessel 1004 is supported by plural support members 1061 and 1062.

Figure 16:
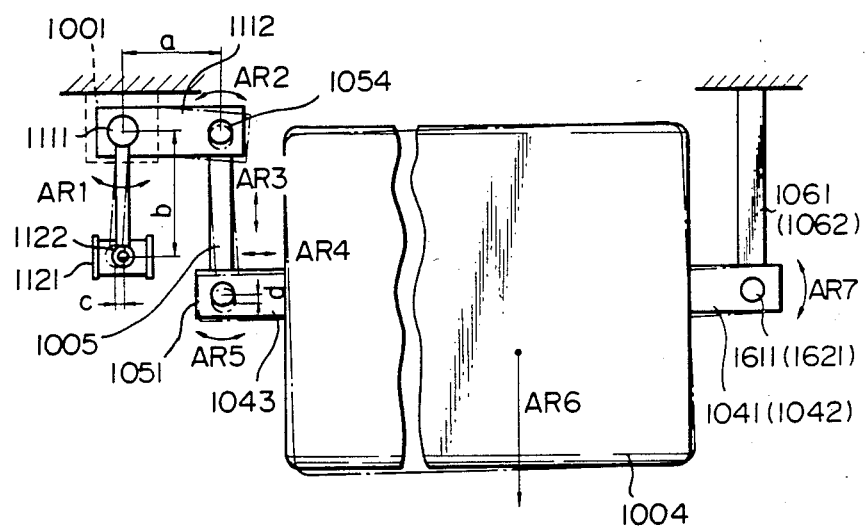
FIG. 16 illustrate the displacement of the members of the device of FIG. 14.

The structure illustrated in FIG. 16 includes a torsion bar 1111 in the liquid amount detection unit 1001, an arm 1112, pins 1051, 1611,1621, and 1054, a first coil 1121, a second coil 1122, and vessel arms 1041, 1042, and 1043. The vessel arms 1041, 1042, and 1043 are projected from the vessel 1004.

Figure 15:
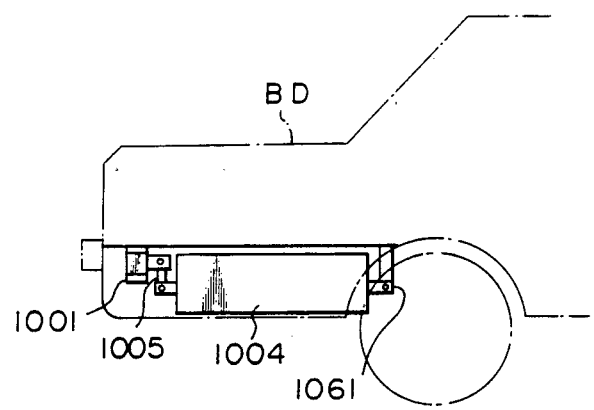
FIG. 15 illustrates the vessel arranged in a rear bottom portion of an automobile.

The rod 1005 and the support members 1061 and 1062 are coupled to the arm 1112 and the tank arms 1041, 1042, and 1043 by means of the pins 1051 through 1054, bearings 1115 and spacers 1114 made of thrust material such as, for example, polytetrafluroethylene. Hence, the movements of the structural elements in the direction indicated by arrows AR1 through AR7 in FIG. 16 are possible. The liquid amount detection unit 1001 and the support members 1061 and 1062 are fixed to the body BD of the automobile as illustrated in FIG. 15.

Figure 19:
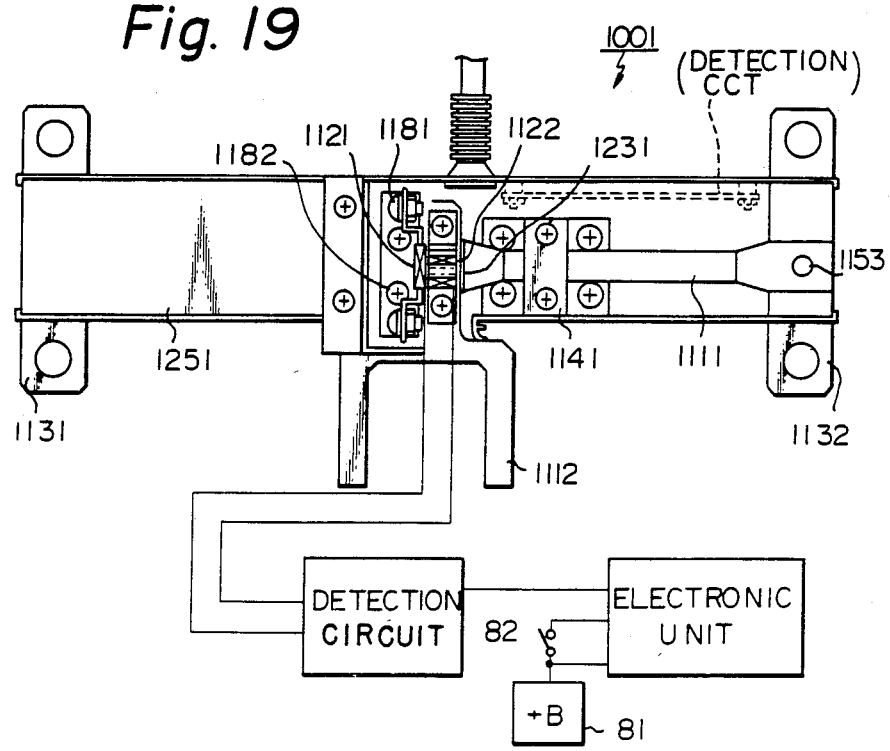
FIG. 19 illustrates the detailed structure of the liquid amount detection portion of the device of FIG. 14.
Figure 20:
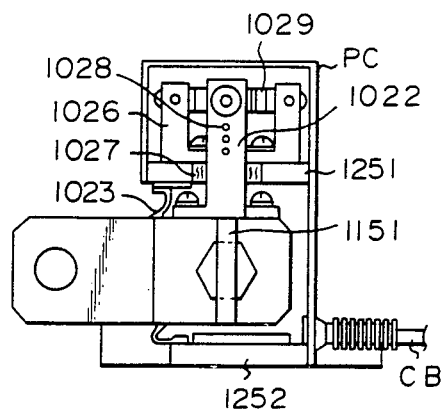
FIG. 20 is a cross-sectional view of the central portion of the structure of FIG. 19.

The structure of the liquid amount detection unit 1001 is illustrated in FIG. 19. A cross-sectional view of the central portion of the structure of FIG. 19 is illustrated in FIG. 20.

The liquid amount detection unit 1001 includes the arm 1112, the torsion bar 1111, pins 1153, holders 1141 and 1142, plates 1251 and 1252, a support element 1026, a first bobbin 1029, a second bobbin 1123, the first coil 1121, and the second coil 1122. A ferrite magnetic core is provided inside of the second bobbin 1123. The structure and operation of the liquid amount detection unit 1001 of FIG. 19 is similar to those of FIG. 1.

In the structure illustrated in FIGS. 14 through 18, the vessel 1004 is supported at plural positions by means of the rod 1005 and the support members 1061 and 1062. The coupling portions between the vessel 1004 and the rod 1005 and support members have freedom of movement. Since the vessel 1004 is supported at plural positions, the burden of the weight at each of the plural support positions is reduced.

When the vessel 1004 moves in the circumferential direction of arrow AR7, due to the change of amount of the liquid, taking the position of the pin 1611 as the center, the rod 1005 is moved in a slanted direction. Accordingly, the torsion bar 1111 is twisted by the movement of the arm 1112. As a result, the first coil 1121 is moved so that the corresponding signal is obtained from the first coil 1121.

Thus, when the vessel 1004 moves in a counterclockwise direction to the status illustrated by the chain line in FIG. 16, taking the position of the pins 1611 and 1621 as the center, the arm 1112 and the coil 1121 move in the clockwise direction to the status illustrated by the chain line.

If the rod 1005 does not exist and the arm 1112 is directly coupled to the vessel arm 1043, it would be quite difficult to carry out the detection of the change of the amount of gasoline, the weight of which is approximately 740 g per 1 l, because the elements of the structure of FIG. 16 are allowed to move only to the extent corresponding to the tension applied to the elements, since the elements simply pull each other. Also, the weight of the entire structure of FIG. 16 would be increased without the rod 1005, because the burden of the weight to each of the elements and the coupling portions between the elements is increased.

If the rod 1005 is provided in the structure as illustrated in FIG. 16, movement in the slanted directions is possible as illustrated by arrows AR3 and AR4 and by chain lines, so that the detection of the change of the amount of the liquid by using the torsional displacement of the torsion bar 1111 is ensured.

For example, the relative displacement between the first coil 1121 and the second coil 1122, corresponding to the change from the full state to the empty state of the vessel 1004, is approximately 1.5 mm. If the distance b between the torsion bar 1111 and the first coil 1121 is equal to the distance a between the torsion bar 1111 and the pin 1054, the range of movement d of the vessel 1004 at the position of the pin 1051 can be as small as approximately d=1.5 mm (d=a sin(arcsin c/b)).

Figure 17:
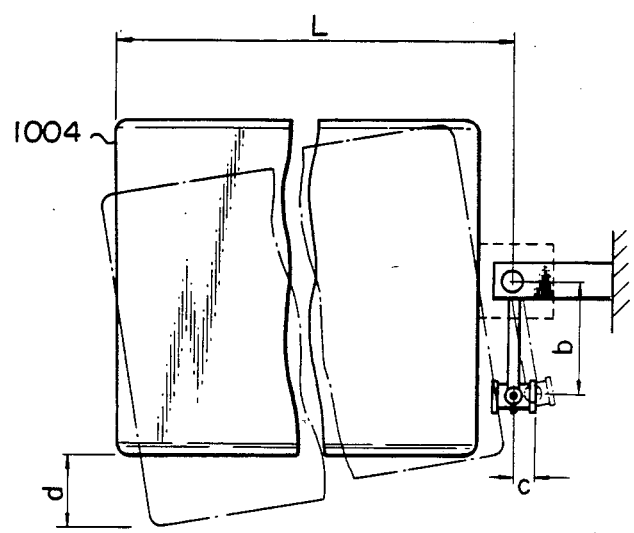
FIG. 17 illustrates the displacement of the members of a device different from the device of FIG. 14 for the purpose of comparison.
Figure 18:
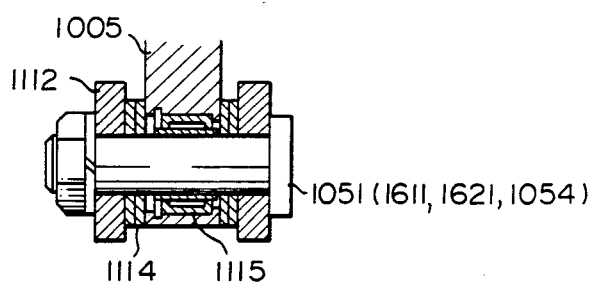
FIG. 18 illustrates details of the coupling between the rod and the arm in FIG. 16.

If the simple cantilever type structure illustrated in FIG. 17, which does not adopt the structure of FIG. 16, is used, the displacement d at the left end of the vessel 1004 is given as:

$$d = L \cdot \sin(\arcsin c/b),$$

where L is the distance between the left side surface of the vessel 1004 and the pin 1051'. Assuming that L is 50 through 70 cm and a is 4 cm, the ratio L/a is 12 through 18, and, hence, the displacement occurring in the structure of FIG. 17 is 12 through 18 times that in the structure of FIG. 16.

Hence, the design of a device adopting the structure of FIG. 17 is difficult in practice from the viewpoints of the precision of the detection of the amount of the liquid, the strength of the elements of the structure, and the strength of the coupling portions of the elements.

In other words, in the structure of FIG. 16, the attainment of the condition $1 \leq d/c$ is relatively easy by changing the ratio between a and b, while, in the structure of FIG. 17, the practically difficult condition $b \geq L$ for the arrangement in the automobile is required for the attainment of the condition $1 \geq d/c$. Accordingly, the structure of FIG. 16 is far more advantageous than that of FIG. 17.

Figure 21:
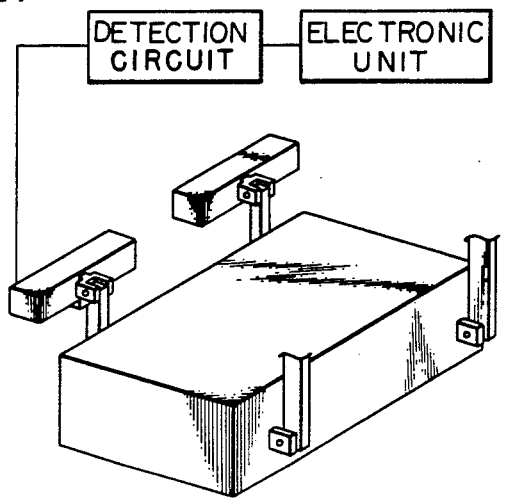
FIGS. 21 through 28 illustrate devices for detecting the amount of liquid in a vessel according to further modified embodiments of the present invention.

Another embodiment is illustrated in FIG. 21, in which an additional torsion bar, which has no torsion sensing device and is used only as a support, is provided.

Figure 22:
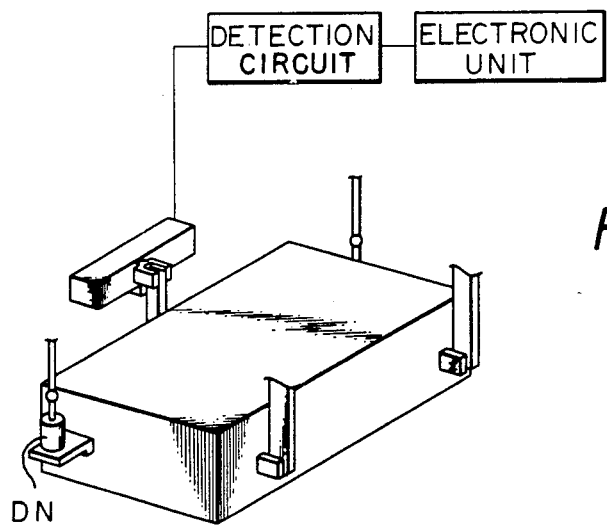
Figure 23:
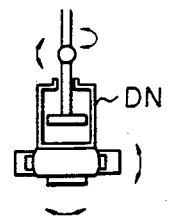

Another embodiment is illustrated in FIGS. 22 and 23, in which a damping member DN is used. The damping member DN may be of the oil type, the air type, or the electromagnetic type. The vibration of the structure due to the vibration of the running automobile in which the structure is arranged is absorbed by the damping member DN. The top and bottom portions of the damping member DN where the damping member is coupled either to the vessel or to the body of the automobile may be allowed to move in the directions of arrows in FIG. 23.

Figure 24:
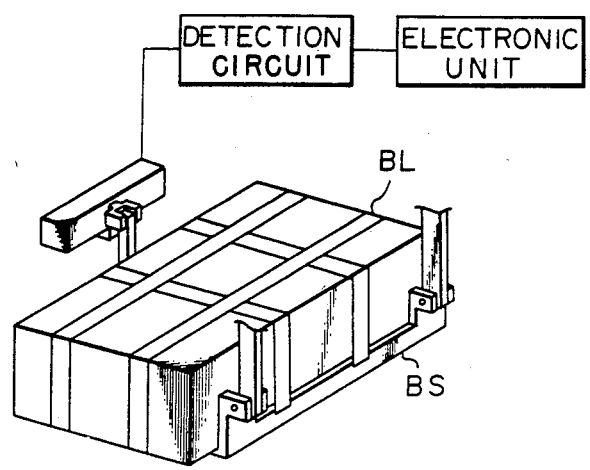
Figure 25:
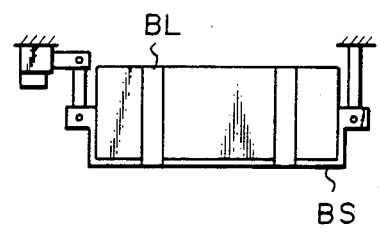

Another embodiment is illustrated in FIGS. 24 and 25, in which the vessel is encompassed by a basket BS and the support structure is coupled to the basket BS. Usual fuel tanks for automobiles can be used as the vessel in the structure of this embodiment. The vessel can be fixed to the basket BS either by using belts BL or by using screw bolts (not shown).

Figure 26:
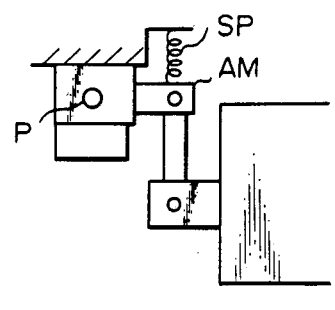

Another embodiment is illustrated in FIG. 26, in which a coil spring SP is used instead of the torsion bar in the above-described embodiments. A pin P is provided at the position corresponding to the position of the torsion bar in the above-described embodiments.

Figure 27:
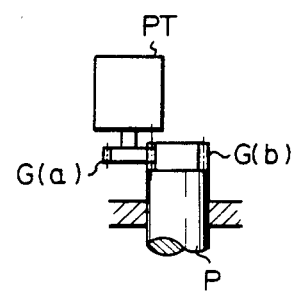

Another embodiment is illustrated in FIG. 27, in which the rotation of a pin P representing the displacement of the vessel (not shown) is detected through a transmission mechanism composed of gears G(a) and G(b) by a potentiometer PT of the rotary type.

Figure 28:
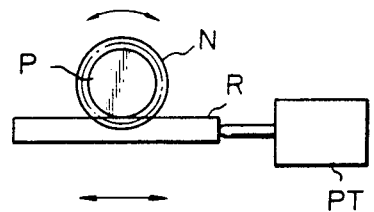

A further embodiment is illustrated in FIG. 28, in which the rotation of a pin P representing the displacement of the vessel (not shown) is detected through a transmission mechanism composed of a pinion N and a rack R by a potentiometer PT of the linear type.

Although in most of the above-described embodiments, a torsion bar is used for the torsion support member, it is possible to use a helical spring of the torsion type in place of the torsion bar.

We claim:

1. A device for detecting an amount of liquid in a vessel, said device comprising:
   torsion structure means connected to said vessel for allowing torsion displacement by the weight of said vessel and the liquid in said vessel;
   means for detecting a torsion displacement of said torsion structure means and generating signals representative of said torsion displacement; and
   an electronic unit for receiving said signals from said detection means;
   wherein said electronic unit comprises:
   means for generating a pulse width signal corresponding to the amount of said liquid on the basis of said signals from said detection means;
   means for detecting the pulse width by generating a signal indicating the number of pulses proportional to the pulse width of said generated pulse width signal;
   means for generating timing pulses having a predetermined interval; and
   average value calculation and display means for calculating average values at predetermined intervals from the values corresponding to the number of pulses of the signal from said pulse width detection means by using said generated timing pulses, and for displaying said calculated values as an indication of said amount of liquid.

2. A device as defined in claim 1, wherein said predetermined interval is 1 through 3 minutes.

3. A device as defined in claim 1, further comprising damper means for absorbing vibration affecting said vessel.

4. A device as defined in claim 3, wherein said damper means is of an oil damper type.

5. A device as defined in claim 3, wherein said damper means has freedom of movement in the radial direction at the support end of said damper means.

6. A device as defined in claim 1, further comprising a pressure sensor means for generating an electric signal corresponding to changes of pressure in said vessel containing said liquid, the output signal of said pressure sensor means being supplied to said detection means for generating a signal to be supplied to said electronic unit for correcting the detection value obtained from said detection means.

7. A device as defined in claim 6, wherein said correction of the detection value is carried out by subtracting the output voltage of said pressure sensor means from the output voltage of a peak hold circuit provided in said detection means.

8. A device as defined in claim 1, further comprising a connecting rod arranged between an arm member connected to said torsion structure means and a tank arm fixed to said vessel, both ends of said rod being rotatable, and support rods coupled to tank arms fixed to said vessel, one end of each of said support rods coupled to said tank arms being rotatable.

9. A device as defined in claim 8, further comprising damper means for absorbing vibration affecting said vessel.

10. A device as defined in claim 9, wherein said damper means is arranged between said vessel and a support body, the coupling between said vessel and said damper means and between said damper means and said support body being formed as a rotatable coupling structure.

11. A device as defined in claim 1, wherein said torsion structure means is a torsion bar.

* * * * *